US010360138B2

(12) United States Patent
Conti et al.

(10) Patent No.: US 10,360,138 B2
(45) Date of Patent: *Jul. 23, 2019

(54) RUN TIME AUTOMATIC WORKLOAD TUNING USING CUSTOMER PROFILING WORKLOAD COMPARISON

(71) Applicant: International Business Machines Corporation, Armonk, NY (US)

(72) Inventors: Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,135

(22) Filed: Feb. 8, 2017

(65) Prior Publication Data
US 2018/0004639 A1      Jan. 4, 2018

Related U.S. Application Data

(63) Continuation of application No. 15/197,829, filed on Jun. 30, 2016.

(51) Int. Cl.
| | |
|---|---|
| *G06F 11/36* | (2006.01) |
| *G06F 8/10* | (2018.01) |
| *G06F 11/34* | (2006.01) |

(52) U.S. Cl.
CPC ......... *G06F 11/3668* (2013.01); *G06F 8/10* (2013.01); *G06F 11/3433* (2013.01); *G06F 11/3672* (2013.01)

(58) Field of Classification Search
None
See application file for complete search history.

(56) References Cited

U.S. PATENT DOCUMENTS 8,589,932 B2 * 11/2013 Bower, III ............ G06F 9/5094
                                                            718/102
9,021,447 B2 *  4/2015 Krajec ................ G06F 11/3636
                                                            717/128

(Continued)

OTHER PUBLICATIONS

List of IBM Patents or Patent Applications Treated As Related (Appendix P), Filed Mar. 13, 2017, 2 pages.

(Continued)

*Primary Examiner* — Isaac T Tecklu
(74) *Attorney, Agent, or Firm* — Cantor Colburn LLP; William Kinnaman

(57) ABSTRACT

Aspects of the present invention include a method, system and computer program product for automatically adjusting the workload of a test to match specific customer workload attributes in accordance with one or more embodiments of the present invention. The method includes a processor selecting one or more customer workload goals of a customer relating to a test of a software program; selecting one or more test workload goals of the test relating to the software program; selecting one or more test data points; determining one or more initial test workload activity levels; and performing a run of the test relating to the software program. The method further includes the processor comparing the selected one or more customer workload goals with the selected one or more test workload goals; and determining whether the selected one or more customer workload goals match with the selected one or more test workload goals.

8 Claims, 4 Drawing Sheets

(56) References Cited

U.S. PATENT DOCUMENTS

| | | | |
|---|---|---|---|
| 9,210,141 B2* | 12/2015 | Anderson | H04L 9/3213 |
| 2005/0149532 A1* | 7/2005 | Hubbard | G06F 7/00 |
| 2006/0095312 A1* | 5/2006 | Conti | G06F 11/3672 |
| | | | 717/124 |
| 2008/0005707 A1* | 1/2008 | Papanikolaou | G06F 17/5009 |
| | | | 702/81 |
| 2013/0110564 A1* | 5/2013 | Hyser | G06Q 10/06 |
| | | | 705/7.11 |
| 2013/0185433 A1* | 7/2013 | Zhu | H04L 67/303 |
| | | | 709/226 |
| 2014/0047095 A1* | 2/2014 | Breternitz | G06F 9/5072 |
| | | | 709/224 |
| 2014/0047272 A1* | 2/2014 | Breternitz | G06F 11/3495 |
| | | | 714/32 |
| 2014/0101475 A1* | 4/2014 | Berke | G06F 1/3206 |
| | | | 713/340 |
| 2014/0258987 A1* | 9/2014 | Zhou | G06F 11/3692 |
| | | | 717/126 |
| 2015/0161385 A1* | 6/2015 | Gounares | G06F 21/54 |
| | | | 726/25 |
| 2016/0357660 A1* | 12/2016 | Dean | G06F 11/3692 |
| 2016/0359683 A1* | 12/2016 | Bartfai-Walcott | |
| | | | H04L 41/5009 |
| 2016/0381129 A1* | 12/2016 | Barsness | G06F 9/5083 |
| | | | 709/226 |
| 2017/0315902 A1* | 11/2017 | Moretto | G06F 11/3664 |
| 2018/0004629 A1 | 1/2018 | Conti et al. | |
| 2018/0004634 A1 | 1/2018 | Brown et al. | |
| 2018/0004643 A1 | 1/2018 | Conti et al. | |
| 2018/0067960 A1 | 3/2018 | Conti et al. | |
| 2018/0068245 A1 | 3/2018 | Conti et al. | |
| 2018/0068249 A1 | 3/2018 | Conti et al. | |
| 2018/0068250 A1 | 3/2018 | Conti et al. | |
| 2018/0068251 A1 | 3/2018 | Conti et al. | |
| 2018/0068325 A1 | 3/2018 | Conti et al. | |
| 2018/0068326 A1 | 3/2018 | Conti et al. | |
| 2018/0074935 A1 | 3/2018 | Conti et al. | |
| 2018/0074938 A1 | 3/2018 | Conti et al. | |
| 2018/0074942 A1 | 3/2018 | Conti et al. | |
| 2018/0074946 A1 | 3/2018 | Conti et al. | |
| 2018/0074947 A1 | 3/2018 | Conti et al. | |
| 2018/0075465 A1 | 3/2018 | Conti et al. | |
| 2018/0075466 A1 | 3/2018 | Conti et al. | |

OTHER PUBLICATIONS

Thomas R. Brown, et al., Pending U.S. Appl. No. 15/197,826 Entitled "Run Time Workload Threshold Alerts For Customer Profiling Visualization" filed Jun. 30, 2016.

Thomas R. Brown, et al., Pending U.S. Appl. No. 15/197,828 Entitled "Run Time and Historical Workload Report Scores for Customer Profiling Visualization" filed Jun. 30, 2016.

Thomas R. Brown, et al., Pending U.S. Appl. No. 15/424,971 Entitled "Run Time Workload Threshold Alerts For Customer Profiling Visualization" filed Feb. 6, 2017.

Thomas R. Brown, et al., Pending U.S. Appl. No. 15/427,129 Entitled "Run Time and Historical Workload Report Scores for Customer Profiling Visualization" filed Feb. 8, 2017.

Thomas W. Conti, et al., Pending U.S. Appl. No. 15/197,827 Entitled "Run Time Test Workload Customer Profiling Baselines Visualization" filed Jun. 30, 2016.

Thomas W. Conti, et al., Pending U.S. Appl. No. 15/197,829 Entitled "Run Time Automatic Workload Tuning Using Customer Profiling Workload Comparison" filed Jun. 30, 2016.

Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.

Thomas W. Conti, et al., Pending U.S. Appl. No. 15/197,843 Entitled "Visual Test Workload Execution Modeling" filed Jun. 30, 2016.

Thomas W. Conti, et al., Pending U.S. Appl. No. 15/259,099 Entitled "Measuring and Optimizing Test Resources and Test Coverage Effectiveness Through Run Time Customer Profiling and Analytics" filed Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed Sep. 8, 2016.

Thomas W. Conti, et al., Pending U.S. Appl. No. 15/259,130 Entitled "Using Workload Profiling and Analytics and Score Complexity of Test Environments and Workloads" filed Sep. 8, 2016.

Thomas W. Conti, et al., Pending U.S. Appl. No. 15/259,168 Entitled "Using Customer Profiling and Analytics to Understand Customer Environment and Workload Complexity and Characteristics by Industry" filed Sep. 8, 2016.

Thomas W. Conti, et al., Pending U.S. Appl. No. 15/424,965 Entitled "Using Customer Profiling and Analytics to Understand Customer Environment and Workload Complexity and Characteristics by Industry" filed Feb. 6, 2017.

Thomas W. Conti, et al., Pending U.S. Appl. No. 15/424,973 Entitled "Run Time Test Workload Customer Profiling Baselines Visualization" filed Feb. 6, 2017.

Thomas W. Conti, et al., Pending U.S. Appl. No. 15/427,130 Entitled "Visual Test Workload Execution Modeling" filed Feb. 8, 2017.

Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.

Thomas W. Conti, et al., Pending U.S. Appl. No. 15/429,262 Entitled "Measuring and Optimizing Test Resources and Test Coverage Effectiveness Through Run Time Customer Profiling and Analytics" filed Feb. 10, 2017.

Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed Feb. 10, 2017.

Thomas W. Conti, et al., Pending U.S. Appl. No. 15/429,268 Entitled "Using Workload Profiling and Analytics and Score Complexity of Test Environments and Workloads" filed Feb. 10, 2017.

* cited by examiner

RUN TIME AUTOMATIC WORKLOAD TUNING USING CUSTOMER PROFILING WORKLOAD COMPARISON

CROSS-REFERENCE TO RELATED APPLICATIONS

The present application is a continuation application of U.S. patent application Ser. No. 15/197,829 filed on Jun. 30, 2016, the contents of which are incorporated herein by reference.

BACKGROUND

The present invention relates to the testing of software, and more specifically, to a method, system and computer program product that implement aspects of workload and operational profiling, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes selecting, by a processor, one or more customer workload goals of a customer relating to a test of a software program; selecting, by the processor, one or more test workload goals of the test relating to the software program; and selecting, by the processor, one or more test data points. The method also includes determining, by the processor, one or more initial test workload activity levels; and performing, by the processor, a run of the test relating to the software program. The method further includes comparing, by the processor, the selected one or more customer workload goals with the selected one or more test workload goals; and determining, by the processor, whether the selected one or more customer workload goals match with the selected one or more test workload goals.

According to another embodiment of the present invention, a system includes a processor in communication with one or more types of memory, the processor configured to select one or more customer workload goals of a customer relating to a test of a software program; to select one or more test workload goals of the test relating to the software program; and to select one or more test data points. The method also includes the processor configured to determine one or more initial test workload activity levels; and to perform a run of the test relating to the software program. The method further includes the processor configured to compare the selected one or more customer workload goals with the selected one or more test workload goals; and to determine whether the selected one or more customer workload goals match with the selected one or more test workload goals According to yet another embodiment of the present invention, a computer program product includes a non-transitory storage medium readable by a processing circuit and storing instructions for execution by the processing circuit for performing a method that includes selecting, by a processor, one or more customer workload goals of a customer relating to a test of a software program; selecting, by the processor, one or more test workload goals of the test relating to the software program; and selecting, by the processor, one or more test data points. The method also includes determining, by the processor, one or more initial test workload activity levels; and performing, by the processor, a run of the test relating to the software program. The method further includes comparing, by the processor, the selected one or more customer workload goals with the selected one or more test workload goals; and determining, by the processor, whether the selected one or more customer workload goals match with the selected one or more test workload goals.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
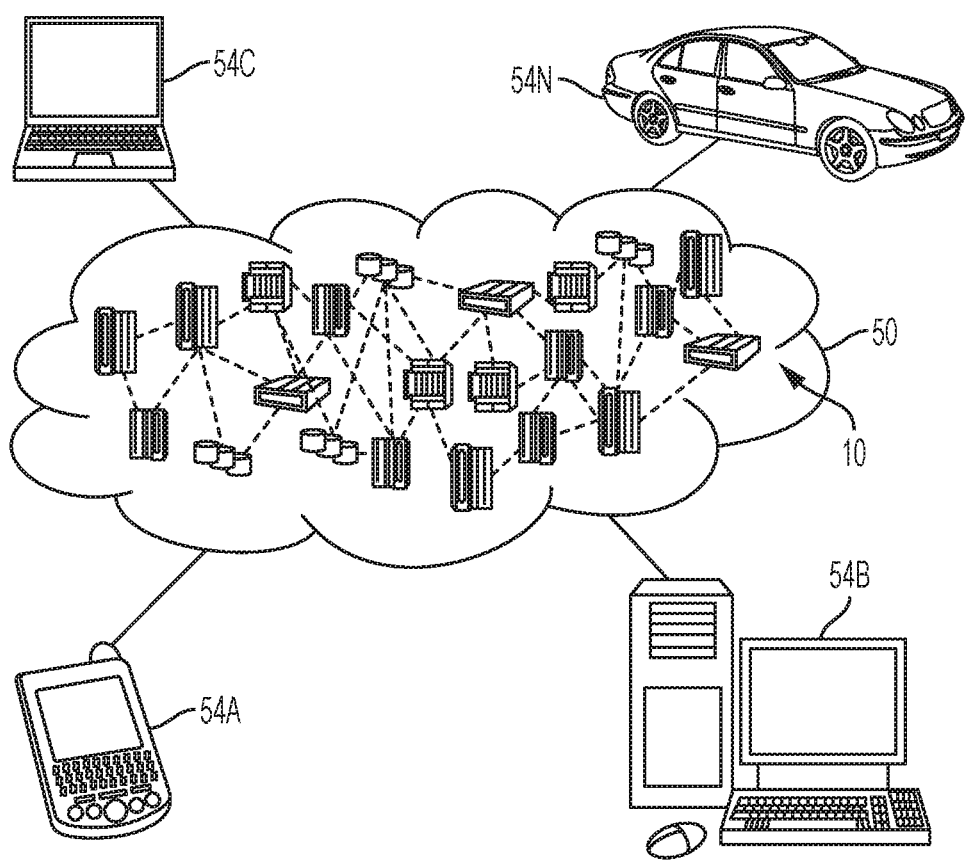
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
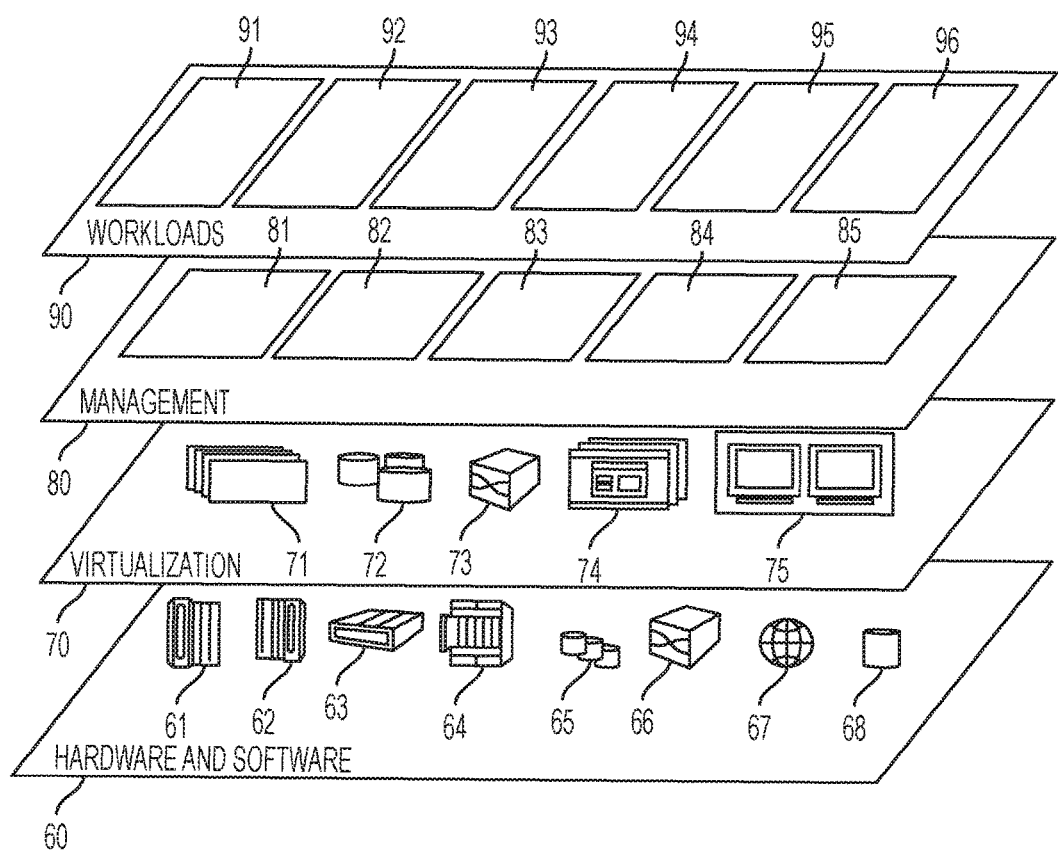
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for automatically adjusting the workload of a test to match specific customer workload attributes in accordance with one or more embodiments of the present invention.

Figure 3:
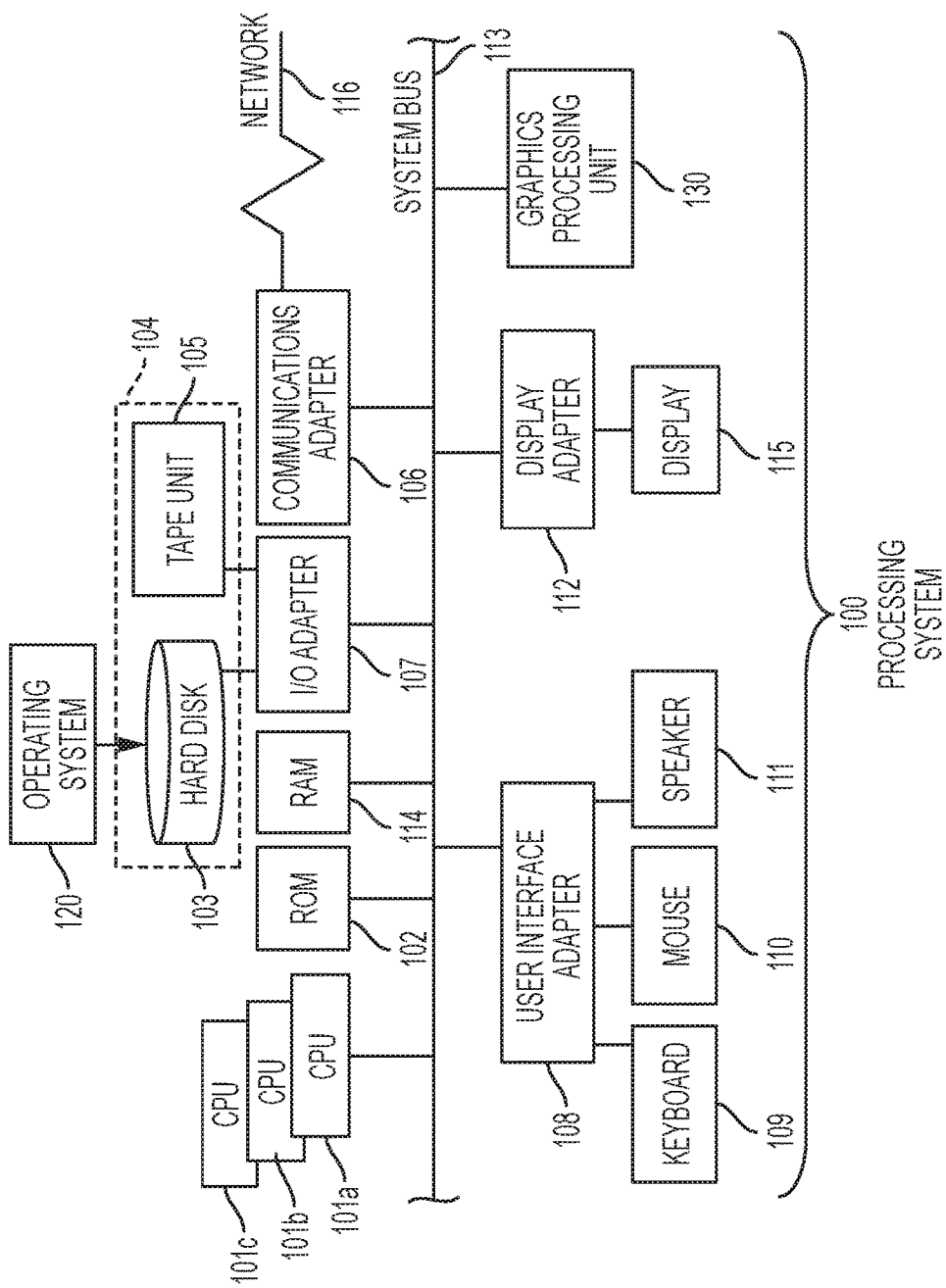
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for automatically adjusting the workload of a test to match specific customer workload attributes.

One or more embodiments of the present invention allow for automatic tuning and/or adjustment of test workload to match or exceed specific customer workload attributes for a variety of purposes.

Run time automatic test workload tuning in accordance with one or more embodiments of the present invention assists in continuously monitoring and effectively tuning (i.e., adjusting) a test workload in comparison to one or more customer workloads. This is accomplished in a time sensitive manner and with minimal to no human intervention or assistance required. Automatic run time test workload tuning is beneficial in that it significantly decreases the amount of workload assessment and adjustment times to close to run time (possibly in minutes), as opposed to possibly delayed or significant time later in the workload run (potentially hours or even days), or even after the test workload run has completed.

Given that test workload runs can be complicated, resource and time intensive, limited in availability, and financially expensive to configure, stage, run, and analyze, and can span multiple days or even weeks (often including non-user monitored off-shift and weekend time), providing an automated system and method to automatically tune in time test workloads in accordance with one or more embodiments of the present invention that match or exceed key attributes of the compared customer workload(s) can be relatively cost and time effective.

One or more embodiments of the present invention provide run time workload automated tuning and adjustment, with minimal to no continuous human intervention, to attain (usually match or exceed) any of a variety of customer workload conditions, including for client care, benchmark, performance, test, and other workloads.

Figure 4:
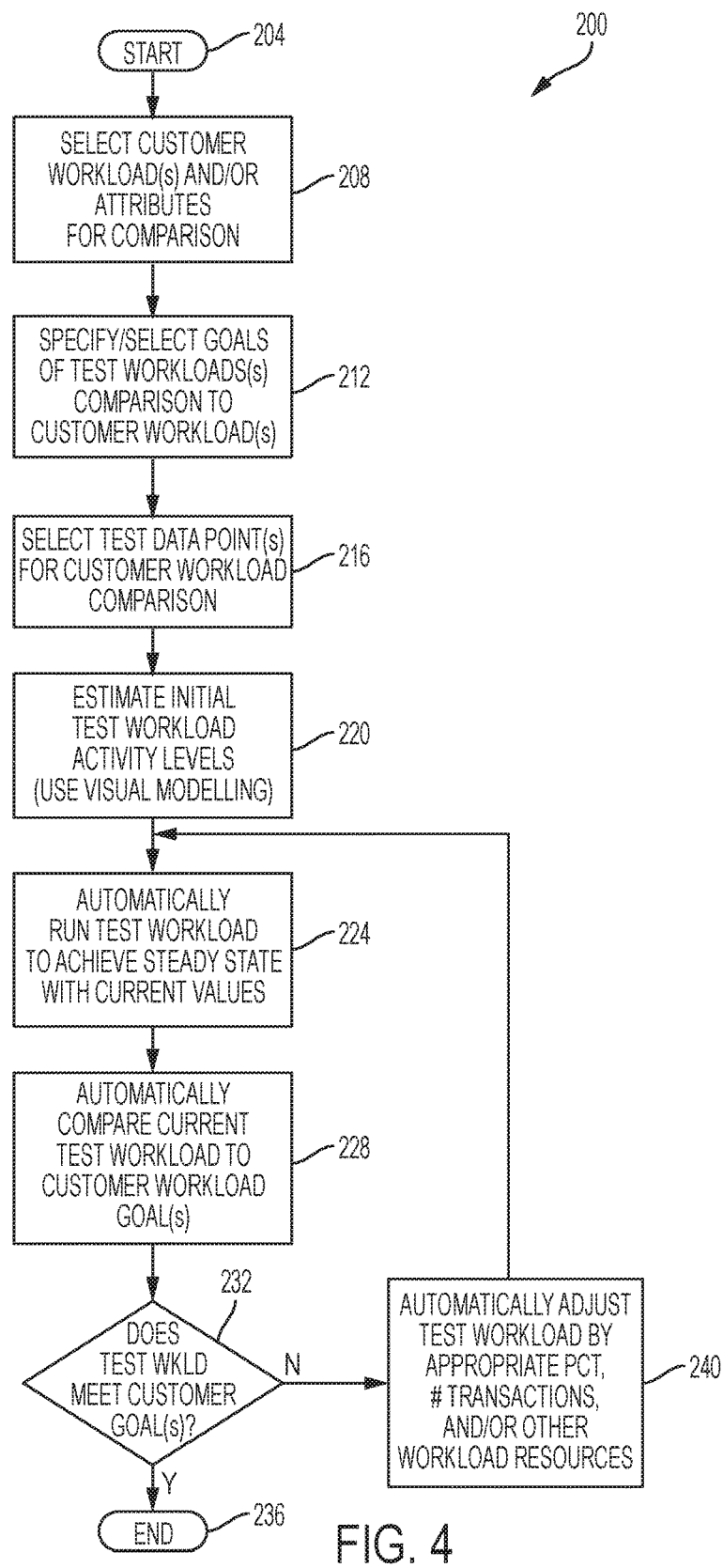
FIG. 4 is a flow diagram of a method for automatically adjusting the workload of a test to match specific customer workload attributes in accordance with one or more embodiments of the present invention.

With reference now to FIG. 4, a flow diagram illustrates a method 200 according to one or more embodiments of the present invention for.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

The method 200 begins in a block 204, followed by block 208 in which an operation selects one or more customer workloads and/or attributes for comparison. An operation in block 212 specifies or selects attainment goals of the test workloads in comparison to the one or more customer workloads. These attainment goals may be, for example, pre-configured, saved, and reusable (e.g., in a database within a customer profiling baselines web application). They may also be created, updated or retrieved by the test user before or during the workload run.

The attributes of the attainment goals may include, for example and without limitation: specific workload activity levels/attributes per data point(s), analysis point(s), formula point(s), and many other workload characteristics; expression in terms of actual values, absolute and/or relative percentages, and many other representations; and specific time frame(s) for a set of workload goals. For example: one set of attainment goals for the batch workload time frame; a second set of attainment goals for the online workload time frame; and a third set of attainment goals for all other time frames.

The attributes of the attainment goals may also include priorities configured at: the attainment goal set level; the individual data point(s), analysis point(s), and/or formula point(s) within and across (all) sets of attainment goals; and collective workload level.

The attributes of the attainment goals may further include different ranges of attainment to the customer workload resource. For example, an attainment range for a customer data point value may include: approaching the customer value within less than 10-20%; matching the customer value within a few percentage points, plus or minus; exceeding the customer value by 10-20%; and significantly exceeding the customer value by over 20%

In an operation in block 216, one or more test data points are selected for comparison to the previously selected one or more customer workloads and/or attributes. Then, in an operation in block 220, the initial test workload activity levels are estimated or determined. A visual modeling method may be used to carry out this functionality.

In an operation in block 224, the test workload is automatically performed or run to achieve a steady state with the selected current values for the test data points. Then in an operation in block 228, the current test workload is automatically compared to the aforementioned exemplary goals of the customer workload. In an operation in block 232, a check is performed to see if the test workload meets the customer goals. If so, the method 200 ends in block 236. If not, an operation is performed in block 240 to automatically adjust the test workload by, for example, an appropriate percentage, by a number of transactions, and/or by other test workload resources discussed herein. The method 200 then branches back to the aforementioned block 224.

In one or more embodiments of the present invention, the automated run time workload tuning functionality provides multiple capabilities, efficiencies, and financial benefits for the test user or operator, including optimizing the run time effectiveness of the test workload run (e.g., software, hardware, firmware) based on a prioritized list(s) of goals. Intended goals may include emulating key characteristics of a customer workload environment, implementing a test recreation or replication, achieving benchmark and/or performance test goals, etc. Intended goals may also include matching the different key workload characteristics based on the type of workload at a specific time of day—for example, batch overnight and online during the day.

Additional benefits include tuning test workloads to be relatively much closer to their intended goal through the very nature of faster and continuous automated tuning, response/feedback, and analysis as tuning input. Also, to significantly reduce the amount of limited and high value operating system environment systems, storage, network, environmental, personnel time and resources to accomplish test objectives, thereby resulting in both financial savings and reduced environmental impact. Further, to increase test plan efficiency through expanded test coverage, resulting in enhanced product quality and greater customer satisfaction. By reducing repeat test workload runs through higher individual workload run effectiveness, the test user or operator can run additional and/or expanded test cases and scenarios, and ensure that each workload run maximizes a successful outcome.

The added functionality provided by one or more embodiments of the present invention allows for automated run time workload tuning and adjustment to attain (i.e., usually match or exceed) a variety of user specified customer workload conditions. Exemplary embodiments are applicable to a variety of product missions and purposes including for, but not limited to, benchmark (recreate and/or critical situation), client care, competitive displacement, development, performance, support and test.

A customer profiling baselines visualization web application methodology utilizes existing customer data coupled with the live collection of test data, and storing this data in a database (e.g., DB2). The data may be used in a web application to visually represent the levels of load and stress and ratios of activity for sets of related data points. As an additional, integrated feature of this customer profiling baselines visualization web application, highly customizable report scores (including a wide range of selection, weighting, and formula computational criteria) can be configured at any of the different workload levels.

The run time workload report scores calculated for any of these different workload levels are stored in the customer profiling baselines visualization database and can be retrieved for later comparisons of customer and/or test workloads. Run time score retention in the customer profiling baselines visualization database also provides analytics on the consistency, variability, scalability, availability, reliability, and other expected and unexpected behaviors of individual and collective workload runs.

These workload report scores can serve as the relative or absolute comparison values for the attainment goals specified for the run time automatic tuning workload. Using the report scores for specific workload attributes, the run time automatic workload tuning feature can adjust the test workload to provide more or less resources to attain the desired goal for that attribute, in relation to the customer workload(s) to which it is actively being compared. These workload adjustment activities/updates are retained in the customer profiling baselines visualization database, and available for post-workload run analytics and reports. These workload adjustment activities/updates may be used to determine initial resource levels to set for future test workload runs, to potentially meet the attainment goals faster and more efficiently for these future test workload runs.

Test workload automated adjustments can be made through a variety of control mechanisms (e.g., JCL, execs, scripts, etc.) that are similar to the controls used to start, modify, and stop the workload. One infrastructure for these workload controls may comprise the aforementioned customer profiling baselines visualization web application. A variety of automated workload change control mechanisms can be employed to increase or decrease workload attributes (for example, data points) characteristics. Some control mechanisms may include iterative resource percentage changes between the current and target data point values, until the current value meets or exceeds the target value. Other control mechanisms may include moderate to significant iterative resource value increases or decreases from the current to target values.

One or more embodiments of the present invention allow for the run time automatic tuning workload to provide the test user or operator with the capability to configure one to multiple sets of attainment goals for the test workload in relation to the customer workload(s). Although most test workload goals may be to match or exceed specific customer workload resource value(s), some initial test workload goals may be to only achieve a (lesser) percentage of the customer value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   selecting, by a processor, one or more customer workload goals of a customer relating to a test of a software program;
   selecting, by the processor, one or more test workload goals of the test relating to the software program;
   selecting, by the processor, one or more test data points;
   determining, by the processor, one or more initial test workload activity levels based on a visual modeling method;
   performing, by the processor, a run of the test relating to the software program to achieve a steady state with selected current values of the one or more test data points;
   comparing, by the processor, the selected one or more customer workload goals with the selected one or more test workload goals;
   determining, by the processor, whether the selected one or more customer workload goals match with the selected one or more test workload goals;
   adjusting, by the processor, the selected one or more test workload goals to match selected one or more customer workload goals using workload change control mechanisms to increase or decrease test workload attributes in response to a determination that the selected one or more customer workload goals does not match with the selected one or more test workload goals;
   based on report scores for specific workload attributes, automatically adjusting a test workload to provide more or less resources to attain the desired goal for a corresponding attribute; and
   storing the workload adjustments in a customer profiling baselines database for use in determining initial resource levels to set for future test workload runs.

2. The computer-implemented method of claim 1 wherein if the processor determines that the selected one or more customer workload goals do not match with the selected one or more test workload goals, then the processor performing a run of the test relating to the software program; the processor comparing the selected one or more customer workload goals with the selected one or more test workload goals; and the processor determining whether the selected one or more customer workload goals match with the selected one or more test workload goals.

3. The computer-implemented method of claim 1 wherein the one or more workload goals of a customer relating to a test of the software program include one or more attributes.

4. The computer-implemented method of claim 3 wherein the one or more attributes comprise one or more workload characteristics.

5. The computer-implemented method of claim 4 wherein the one or more workload characteristics is selected from the group consisting of specific workload activity levels per data points, analysis points, and formula points.

6. The computer-implemented method of claim 3 wherein the one or more attributes comprise priorities configured at an attainment goal set level, individual data points, analysis points, and formula points within and across all sets of attainment goals, and collective workload level.

7. The computer-implemented method of claim 3 wherein the one or more attributes comprise different ranges of attainment to a customer workload resource.

8. The computer-implemented method of claim 1 further comprising visually representing levels of load and stress, and ratios of activity for the one or more test data points.

* * * * *